(12) United States Patent
Sartini (10) Patent No.: US 8,876,148 B2
(45) Date of Patent: Nov. 4, 2014

(54) MOBILE BUILDING TRANSPORTATION DEVICE

(71) Applicant: West States Tire & Axle, Inc., Cedar City, UT (US)

(72) Inventor: Heath Sartini, Cedar City, UT (US)

(73) Assignee: West States Tire & Axle, Inc., Cedar City, UT (US)

( * ) Notice: Subject to any disclaimer, the term of this patent is extended or adjusted under 35 U.S.C. 154(b) by 0 days.

(21) Appl. No.: 14/079,327

(22) Filed: Nov. 13, 2013

(65) Prior Publication Data

US 2014/0070517 A1    Mar. 13, 2014

Related U.S. Application Data

(63) Continuation-in-part of application No. 13/292,813, filed on Nov. 9, 2011, now abandoned.

(60) Provisional application No. 61/411,822, filed on Nov. 9, 2010.

(51) Int. Cl.
*B60D 1/34* (2006.01)
*B62D 21/20* (2006.01)
*B60G 9/00* (2006.01)

(52) U.S. Cl.
CPC *B62D 21/20* (2013.01); *B60G 9/00* (2013.01); *B60G 2300/04* (2013.01); *B60G 2300/38* (2013.01)
USPC .......................................... 280/656; 280/789

(58) Field of Classification Search
USPC .......... 280/406.2, 656, 789, 798, 796; 52/143
See application file for complete search history.

(56) References Cited

U.S. PATENT DOCUMENTS

| | | | |
|---|---|---|---|
| 2,085,353 A | | 6/1937 | Culemeyer et al. |
| 2,273,503 A | * | 2/1942 | Couse ........................... 280/788 |
| 2,741,489 A | | 4/1956 | Bigge |
| 3,019,927 A | | 2/1962 | Sheehan, Jr. et al. |
| 3,254,914 A | | 6/1966 | Steck |
| 3,332,699 A | | 7/1967 | Devys |

(Continued)

OTHER PUBLICATIONS

How Modular Homes and Manufactured Homes Differ; About.com; http://homebuying.about.com/cs/modulareducation/a/modularhomes.htm?p=1; as accessed Sep. 8, 2010; 1 page.

(Continued)

*Primary Examiner* — Tony Winner
(74) *Attorney, Agent, or Firm* — Thorpe North & Western LLP (57) ABSTRACT

A mobile building transportation device can comprise a frame, a front axle, and a rear axle. The frame can support a mobile building for transport on a public highway and can include left and right longitudinal support members and front and rear transverse support members that bear at least a portion of the weight of the mobile building. The front and rear axles can each be coupled to the frame by suspension components. The front and rear transverse support members can be configured to support the mobile building above the front and/or rear axles to facilitate minimizing a vertical distance between the mobile building and the front and/or rear axles. This can minimize a height of a center of gravity of the mobile building and facilitate unobstructed movement of the front and rear axles through a range of motion of the front and/or rear suspension components. At least one of the longitudinal and transverse support members can be constructed, at least in part, of tubing.

24 Claims, 5 Drawing Sheets

(56) References Cited

U.S. PATENT DOCUMENTS

| | | |
|---|---|---|
| 3,430,791 A | 3/1969 | Moss |
| 3,469,723 A | 9/1969 | Mathley et al. |
| 3,505,767 A | 4/1970 | Fyle |
| 3,697,098 A | 10/1972 | Fisher |
| 3,716,267 A | 2/1973 | Lindsay |
| 3,726,538 A | 4/1973 | Robinson |
| 3,743,322 A | 7/1973 | Sherrod |
| 3,796,440 A | 3/1974 | Shave |
| 3,835,600 A | 9/1974 | Padula et al. |
| 3,885,691 A | 5/1975 | Knapp |
| 4,065,892 A | 1/1978 | Lawrence |
| 4,114,328 A | 9/1978 | Lawrence |
| 4,200,305 A | 4/1980 | Eubank |
| 4,202,564 A | 5/1980 | Strader |
| 4,232,879 A | 11/1980 | Boxrud |
| 4,753,450 A | 6/1988 | Wibben |
| 5,232,234 A | 8/1993 | McCombs |
| 5,417,539 A | 5/1995 | van der Wal |
| 6,254,132 B1 | 7/2001 | Lindsay |
| 6,550,798 B2 | 4/2003 | MacKarvich |
| 6,681,535 B1 | 1/2004 | Batchelor |
| 6,682,280 B1 | 1/2004 | Lindsay |
| 6,820,889 B1 | 11/2004 | Anderson |
| 7,017,925 B2 | 3/2006 | Lindsay |
| 7,065,925 B2 | 6/2006 | Hansort |
| 7,065,926 B2 | 6/2006 | Brandt et al. |
| 7,112,029 B1 | 9/2006 | Neatherlin |
| 7,165,370 B1 | 1/2007 | Wolfe |
| 7,832,155 B1 | 11/2010 | Shea |
| 2008/0036240 A1 | 2/2008 | Lusk et al. |
| 2009/0155035 A1 | 6/2009 | Lundin |

OTHER PUBLICATIONS

Manufactured Housing; Wikipedia; http://en.wikipedia.org/wiki/Manufactured_housing; page last modified on Feb. 3, 2012; 6 pages.

Modular Building; Wikipedia; http://en.wikipedia.org/wiki/Modular_building; page last modified on Jan. 9, 2012; 6 pages.

* cited by examiner

MOBILE BUILDING TRANSPORTATION DEVICE

RELATED APPLICATION

This application claims the benefit of U.S. application Ser. No. 13/292,813, filed Nov. 9, 2011, which claims the benefit of U.S. Provisional Application No. 61/411,822, filed Nov. 9, 2010, each of which is incorporated herein by reference.

BACKGROUND

Mobile buildings, such as manufactured or "mobile homes," classrooms, offices, storage containers, etc., can be moved from one location to another. Often, transport of mobile buildings occurs on public highways over distances of several hundred miles. Government regulations may apply to the transport of mobile buildings. In the United States, for example, federal regulations govern manufactured home transport to ensure safety during transport. However, these safety regulations permit use of tires that are typically only designed for a one-way trip such as bias ply tires. These tires may occasionally be reused if certain tread limitations and conditions are met. Similarly, brakes, axles, and wheel bearings for mobile building transport may also be designed for minimal service life. For example, many brakes are electrically operated and are barely adequate, if at all, for the intended use. Thus, after only one use, many tires, brakes, and wheel bearings are replaced or refurbished. The constant need for replacement or repair can result in significant expense over time. Additionally, many of the tire, brake, and axle designs currently in use for manufactured home transport were originally designed decades ago. Although, at the time, the designs satisfied federal safety regulations, in more recent years, the size and especially weight of manufactured homes has increased, rendering many tires, brakes, and axles currently in use unsafe and/or insufficient relative to the safety regulations. Far worse than violating the safety regulations, the old designs are frequently dangerous. For instance, many axles are bent or supports fail while transporting a modern manufactured home on just a one-way trip to the home's destination.

In addition to having many of the aforementioned aspects typical of the old designs, the mobile building carrier disclosed in U.S. Pat. No. 6,682,280 to Lindsay is configured such that a mobile building sits on top of a longitudinal frame of the carrier. This configuration results in a high center of gravity for the mobile building, which can lead to instability of the mobile building and the carrier during transit. These and other deficiencies in mobile building transport systems remain.

SUMMARY

Thus, there is a need for a mobile building transportation device that not only meets or exceeds applicable safety regulations, but is also durable and capable of multiple trips or extended use. Accordingly, a mobile building transportation device, system, and associated methods are provided. Such a device can comprise a frame to support a mobile building for transport on a public highway. The frame can have a left longitudinal support member disposed at a left side of the frame and a right longitudinal support member disposed at a right side of the frame. The frame can also have a front transverse support member disposed toward a front of the frame and a rear transverse support member disposed toward a rear of the frame. The front and rear transverse support members can be configured to interface with the mobile building and bear at least a portion of the weight of the mobile building. The frame can further include a coupling feature associated with each of the front and rear transverse support members for securing the mobile building to the frame. The mobile building transportation device can further comprise a front axle disposed at a front end of the frame, coupled to the frame by a front suspension component and a rear axle disposed at a rear end of the frame, coupled to the frame by a rear suspension component. The front and rear transverse support members can be configured to support the mobile building above the front and rear axles to facilitate minimizing a vertical distance between the mobile building and the front and rear axles, to minimize a height of a center of gravity of the mobile building and facilitate unobstructed movement of the front and rear axles through a range of motion of the front and rear suspension components. At least one of the left longitudinal support, the right longitudinal support, the front transverse support member, and the rear transverse support member can be constructed, at least in part, of tubing.

Additionally, a mobile building transportation system in accordance with the principles herein can comprise a mobile building transportation device and a mobile building disposed on the mobile building transportation device.

Furthermore, a method of using a mobile building transportation device in accordance with the principles herein can comprise obtaining a mobile building transportation device and disposing a mobile building on the mobile building transportation device.

These figures are provided merely for convenience in describing specific embodiments of the invention. Alteration in dimension, materials, and the like, including substitution, elimination, or addition of components can also be made consistent with the following description and associated claims. Reference will now be made to the exemplary embodiments illustrated, and specific language will be used herein to describe the same. It will nevertheless be understood that no limitation of the scope of the invention is thereby intended.

DETAILED DESCRIPTION

Reference will now be made to certain examples, and specific language will be used herein to describe the same. Examples discussed herein set forth a mobile building transportation device and associated methods that can safely transport a mobile building on a public highway.

With the general embodiments set forth above, it is noted that when describing the mobile building transportation device, or the related method, each of these descriptions are considered applicable to the other, whether or not they are explicitly discussed in the context of that embodiment. For example, in discussing the mobile building transportation device per se, the system and/or method embodiments are also included in such discussions, and vice versa.

It is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "an axle" includes one or more of such axles.

Also, it is noted that various modifications and combinations can be derived from the present disclosure and illustrations, and as such, the following figures should not be considered limiting.

In describing and claiming the present invention, the following terminology will be used in accordance with the definitions set forth below.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Any steps recited in any method or process claims may be executed in any order and are not limited to the order presented in the claims unless otherwise stated. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

As used herein, a "mobile building" is a transportable edifice or structure, which is built on a permanent frame that can couple with wheels for transporting. Examples of mobile buildings can include a manufactured or mobile home, a classroom, an office, a storage container, etc.

As used herein, a "manufactured home" is a structure, transportable in one or more sections and which is built on a permanent frame that can couple with wheels for transporting the manufactured home and is designed to be used as a dwelling with or without a permanent foundation. The frame of the manufactured home is integral to the integrity of the floor system and is often constructed of steel I-beams. A manufactured home is also referred to as a "mobile home" or a "trailer home." Manufactured homes in the United States are governed by the U.S. Department of Housing and Urban Development (HUD) Code. A manufactured home is distinct from a "modular home." For the purposes of this disclosure, one distinguishing feature of the manufactured home is the non-removable frame that can couple with wheels for transporting the manufactured home. Modular homes lack this feature and, thus, are often transported on flatbed trucks.

As used herein the term "highway" includes all public roads and streets to be legally used in transporting the mobile building.

Figure 1:
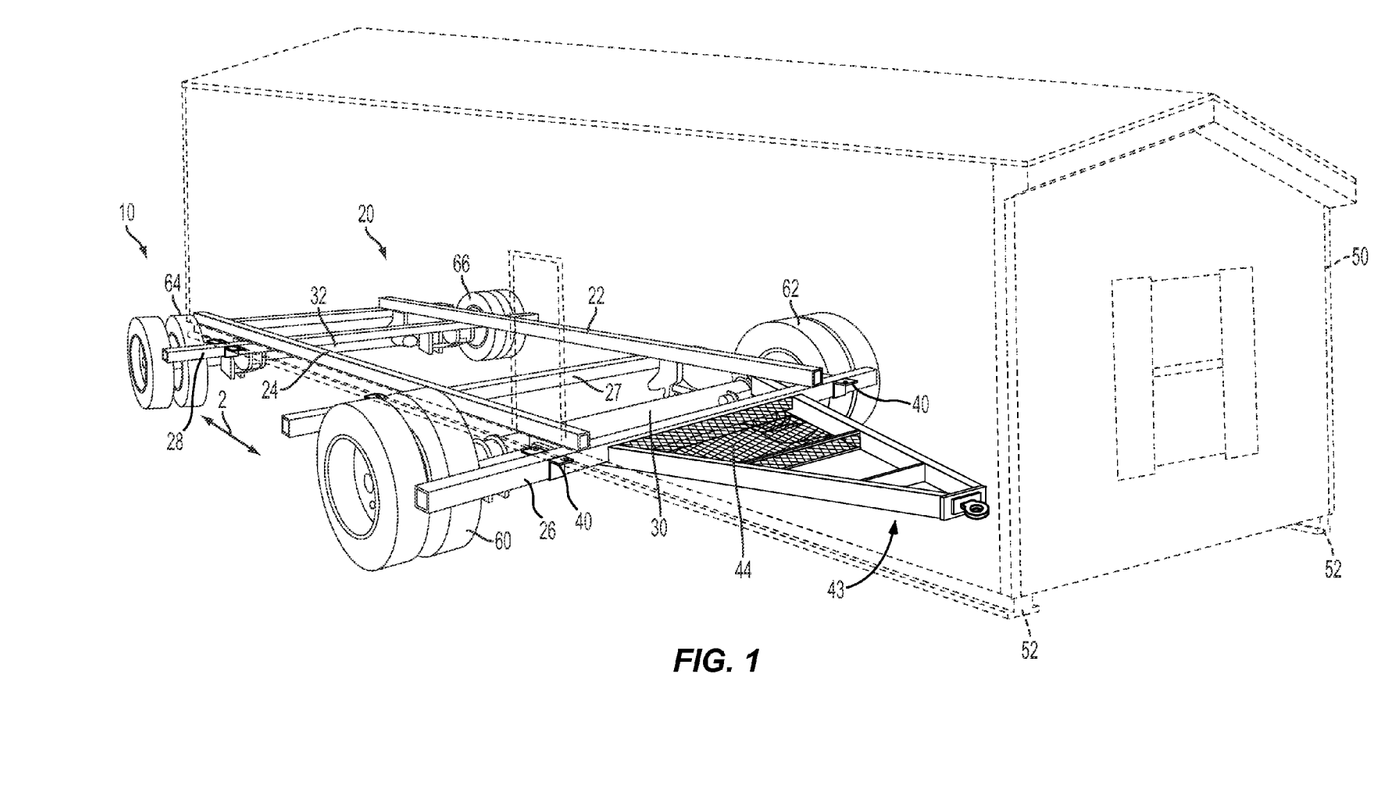
FIG. 1 is a perspective view of a mobile building transportation device in accordance with an example of the present disclosure.
Figure 2:
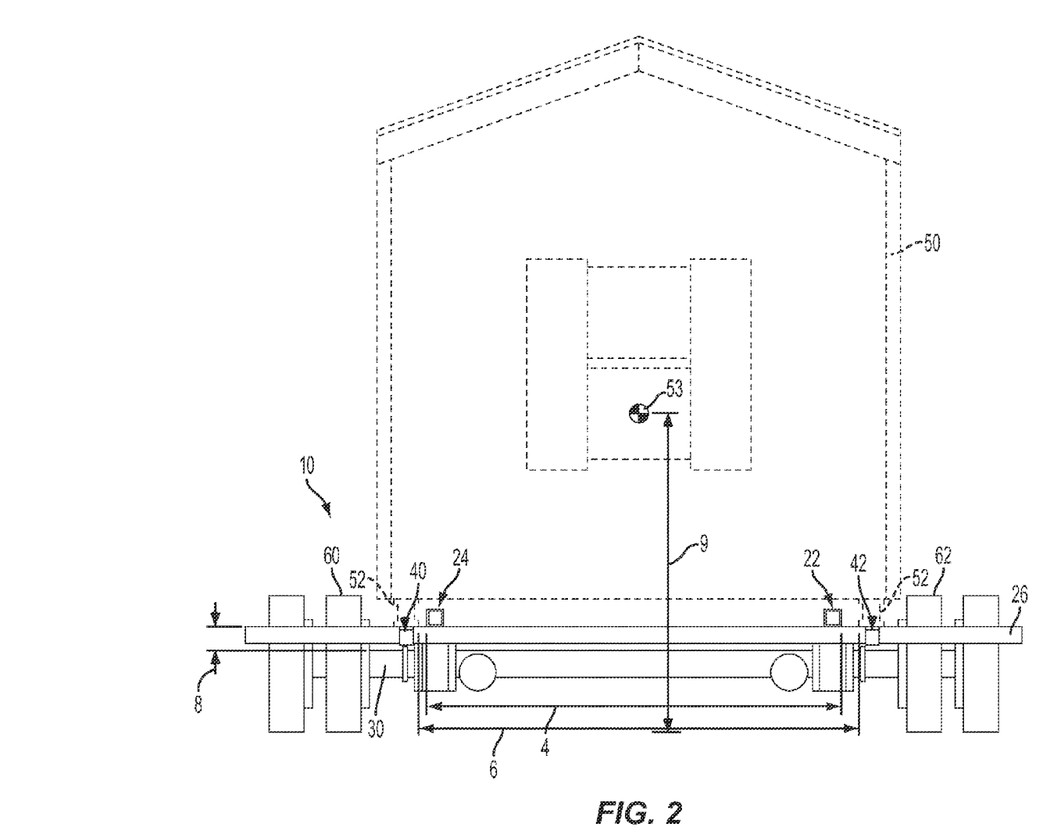
FIG. 2 is an end view of the mobile building transportation device in FIG. 1.

Illustrated in FIGS. 1 and 2 is a mobile building transportation device 10. In accordance with one example of the present disclosure, the mobile building transportation device can comprise a frame 20, a front axle 30, and a rear axle 32. The frame 20 can be configured to support a mobile building 50 for transport on a public highway. For example, the mobile building 50 can be disposed on top of the frame 20, with a frame 52 of the mobile building 50 resting on the frame 20 of the transportation device 10. Thus, the transportation device frame 20 can be configured to bear the weight of the mobile building 50. In one aspect, the transportation device 10 can be disposed under a portion of the mobile building 50, such as a rear portion as illustrated in FIG. 1. The frame 52 of the mobile building 50 can be coupled to the transportation device 10 with any suitable coupling mechanism, as disclosed in more detail hereinafter. For example, coupling features 40 can be operable with removable coupling mechanisms, such as fasteners, to secure the frame 52 of the mobile building 50 to the transportation device 10. A front portion of the mobile building 50 can include a drawbar with a hitch for coupling the mobile building 50 to a towing vehicle, discussed below with regard to FIG. 5. Thus, towing forces can be transferred from the towing vehicle to the transportation device 10 via the hitch, the mobile building frame 52, and the coupling mechanism for the mobile building 50 and the transportation device 10. The transportation device 10 can optionally include a hitch 43 for transport of the transportation device 10 when not transporting a mobile building on the transportation device 10. Typically, the transportation device 10 can have a length which is less than half, and in some cases 20% to 40% of a length of the mobile building frame 50.

The transportation device 10 can include longitudinal support members, as desired, to contribute to the structural integrity of the frame 20 for supporting the mobile building 50. In one aspect, the transportation device frame 20 can include a left longitudinal support member 22 disposed at a left side of the frame and a right longitudinal support member 24 disposed at a right side of the frame. The left longitudinal support member 22 and the right longitudinal support member 24 can be oriented in a longitudinal direction 2. Additional longitudinal support members can be used as well. For example, the frame can include a longitudinal support member disposed in the center of the frame, running the length of the frame and coupling to one or more support members of the frame, as will be discussed more fully below.

The transportation device 10 can also include transverse support members, as desired, to contribute to the structural integrity of the frame 20. In one aspect, the frame can include a front transverse support member 26 disposed toward a front of the frame and a rear transverse support member 28 disposed toward a rear of the frame. The front transverse support member 26 and the rear transverse support member 28 can be configured to interface with the mobile building 50, such as the frame 52 of the mobile building, and bear at least a portion of the weight of the mobile building. As shown in FIGS. 1 and 2, the frame 20 can include multiple front and/or rear transverse support members. For example, two transverse support members 26, 27 can be disposed at the front, one in front of a front tire 60 and one behind the front tire 60. A similar arrangement can be employed at the back of the transportation device. In one aspect, a transverse support member can extend from the right side of the frame to the left side of the frame, as shown in the figures. It should be recognized, however, that a transverse support member need not extend all the way across the frame and can be segmented or extend only partially across the frame, such as be extending only outward from the frame. It should further be recognized that any number of transverse support members can be disposed anywhere on the frame, as desired, such as to provide support and/or coupling locations for the mobile building.

Figure 3:
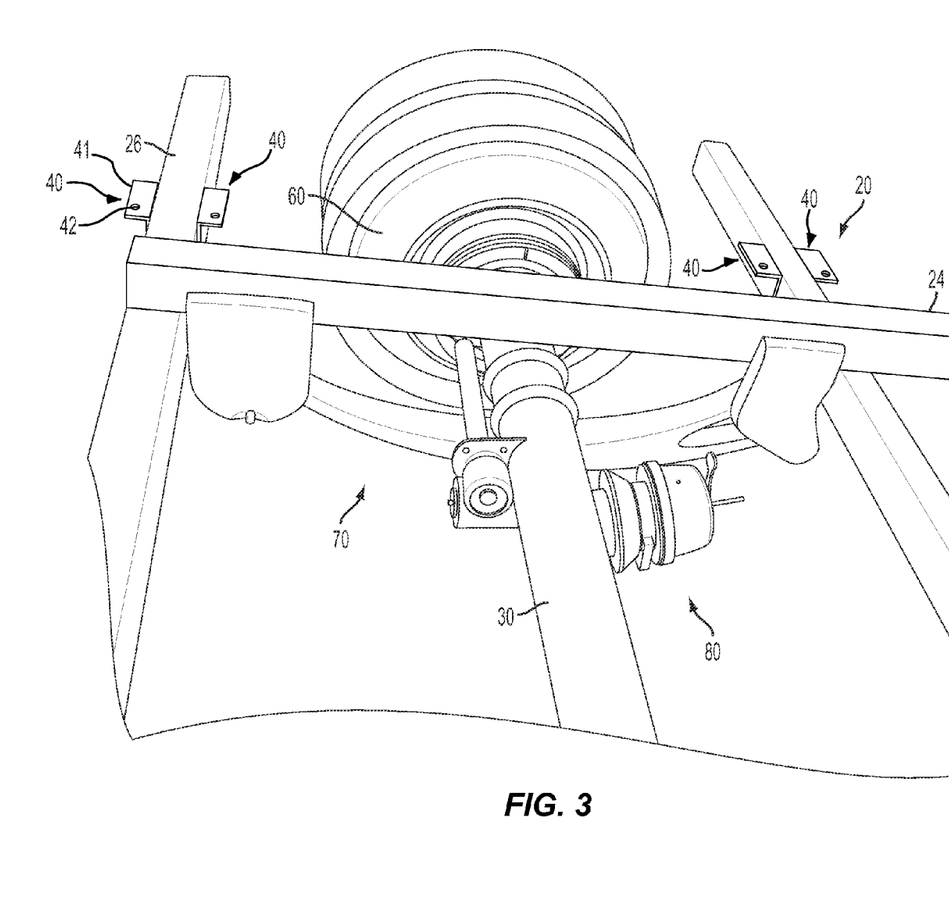
FIG. 3 is a close-up view of a portion of the mobile building transportation device in FIG. 1.

As further illustrated in FIG. 1 and in the close-up view of FIG. 3, the transportation device 10 can include a coupling feature 40 associated with any of the transverse support members, such as the front and rear transverse support members 26, 28, for securing the mobile building 50 to the frame 20. In one aspect, the coupling feature can comprise a flange 41 to facilitate fastening the mobile building to the frame. For example, the coupling feature can comprise a bracket having a flange, and the bracket can be welded to the transverse support member. To rigidly and stably couple the mobile building to the frame, the coupling feature can be configured to secure the mobile home via one or more fasteners. For example, the flange can include a hole 42 to receive a fastener. In one aspect, the frame of the mobile building can also include a hole, which can be drilled at the time of coupling, to receive a fastener that extends through the hole in the flange. Thus, the transverse support members can be configured to not only support the mobile building, but also to provide coupling locations for the mobile building.

In some cases, such as a HUD mobile home, the frame members 52 of the mobile building may be separated by a width such that the frame members do not align with the coupling features 40 of the transportation device 10. In such cases, a block or bracket can be welded or otherwise attached to the frame members 52 to extend to the location of the coupling features 40 to provide a coupling location for the mobile building. The block or bracket can then be drilled to receive a fastener that extends through the hole in the flange of the coupling feature, as described above.

In addition, the mobile building transportation device 10 can include a hitch 43 coupled to the frame 20 to facilitate transporting the transportation device when not supporting a mobile building. In one aspect, the hitch can be coupled to the front transverse support, the left and right longitudinal supports, and/or any other suitable structural feature of the frame. The transportation device can also include a cargo basket 44. In one aspect, the cargo basket can be associated with the hitch, as shown, but it should be recognized that the cargo basket can be located in any suitable location about the frame.

Furthermore, as shown more particularly in FIG. 2, the front and rear transverse support members 26, 28 can maintain a width 4 between the left and right longitudinal support members 22, 24 that is substantially the same from the front to the rear of the frame 20. However, it should be recognized that the width between the left and right longitudinal support members can vary. In a specific aspect, the left and right longitudinal support members can angle toward or away from one another. In another specific aspect, the left and/or right longitudinal support members can comprise multiple sections, where left and right support member sections are at various widths in the frame. Although the specific distance can vary, typical distance between the left and right support members can be about 82 to about 102 inches, and most often about 99.5 inches. This width can generally be about 4 to about 8 inches less than the mobile building width 6 to allow the mobile building frame 52 to rest on the transverse support members 26, 28 outboard of the left and right longitudinal support members 22, 24. The left and right longitudinal support members can therefore fit within the outer frame dimensions of the mobile building 50. In one aspect, the mobile building frame 52 can rest on the transverse support members 26, 28 inboard of the left tires 62, 66 and right tires 60, 64. Thus, the front and rear transverse support members can be configured to support the mobile building outboard of the left and right longitudinal support members, and between the left and right longitudinal support members and a wheel coupled to the front and/or the rear axle. As described in more detail hereinafter, this configuration can facilitate a low ride height and center of gravity 53 for the mobile home 50 compared to previous carrier designs.

In one aspect, the frame 20 can include other support members to contribute to the structural integrity of the frame for supporting the mobile building during transit. For example, the frame can include cross members extending diagonally across the frame to enhance rigidity of the frame.

Additionally, the frame 20 can be constructed of tubing. Tubing can comprise, in whole or in part, steel, aluminum, carbon fiber, or any other suitable structural material in any combination. Tubing can have a cross-sectional shape that is a rectangle, square, circle, oval, triangle, parallelogram, trapezoid, hexagon, octagon, or any other polygon or geometric shape that is suitable for constructing a frame. Additionally, the cross-sectional shape and/or size of the tubing can vary along its length. In some aspects, the tubing can be linear, curved, or a combination of multiple linear and/or curved sections. Although the size of the tubing can vary, typically a 4-6 inch height and 2-3 inch width can be suitable. The tubing wall thickness can vary from about 0.20 to about 0.40 inches and often about 0.25 inches. In one example, the tubing is 6 inches×2 inches at 0.25 inches wall thickness. In another example, the tubing is 4 inches×3 inches at 0.25 inches wall thickness.

Although I-beams efficiently resist bending in a single plane, tubing is advantageous here due to its ability to resist bending and torsion, which is beneficial for a frame that may be subjected to complex loading. Tubing is desirable as well for its ease of fabrication into a frame, which offers greater design flexibility. In one aspect, at least one of the left longitudinal support 22, the right longitudinal support 24, the front transverse support member 26, and the rear transverse support member 28 can be constructed of tubing. In another aspect, the left longitudinal support, the right longitudinal support, the front transverse support member, and the rear transverse support member can be constructed of tubing. It should be understood that frame components can be constructed of tubing in whole or in part. For example, the frame can include a portion constructed of tubing and a portion constructed of I-beam.

Figure 4:
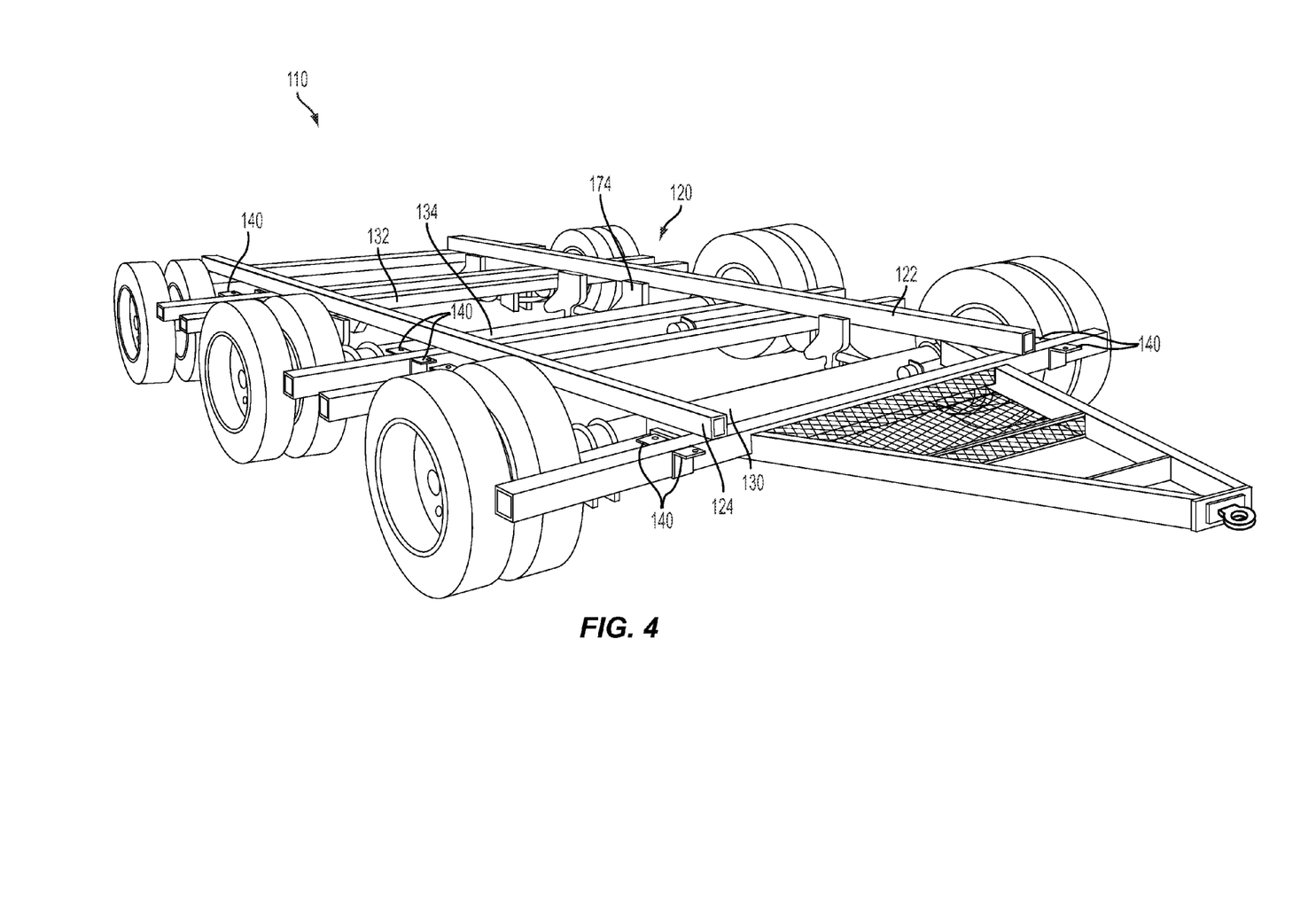
FIG. 4 is a perspective view of a mobile building transportation device in accordance with another example of the present disclosure.

The axles 30, 32 of the mobile building transportation device are configured to be heavy duty and durable. An axle can be designed to accommodate two wheels (one per side) or four wheels (two per side or "dually"). The wheels can include tires that are sufficient to not only carry the required load (such as 5,000 lb. per tire rating), but are also durable enough to maintain integrity for multiple trips under the required load. Non-limiting examples of such tires include steel belt radial. Likewise, axles include hubs and bearings that can withstand the operating loads and survive multiple trips at the operating load. Although the useful lifespan can vary depending on conditions, weight of mobile buildings and the like, typically these devices can carry full loads for at least 50,000 miles or more, and are usually only limited by the tire tread lifespan. In one aspect, the axles can be 22,500 pound rated per axle. This meets or exceeds applicable federal safety regulations for a 42,000 pound manufactured home transported on a transportation device having two axles. In one aspect, the transportation device 10 can have a front axle 30 disposed at a front end of the frame 20. In another aspect, the transportation device 10 can have a rear axle 32 disposed at a rear end of the frame 20. Of course, the mobile building transportation device 10 can include any number of axles, such as a three axle configuration as illustrated in FIG. 4, discussed below. A transportation device having three axles rated at 22,500 pound per axle will meet or exceed applicable federal safety regulations for transportation of a 60,000 pound manufactured home. The number of axles may be limited only by practical considerations such as space constraints or expense. Thus, in one alternative, one or both of the front and rear can include 2 or 3 axles each. Additional axles can make turning progressively more difficult.

To improve ride quality and minimize jostling or jarring the mobile building 50 during transport, axles can be coupled to the frame 20 by a suspension component. Suspension components can include suspension springs, shock absorbers, linkages, multi-bar mechanisms, support arms, hangers, shackles, bushings, mounting bolts, etc. In a specific aspect, the front axle 30 is coupled to the frame 20, such as to the longitudinal support member 24, by a front suspension component 70, as illustrated in FIG. 3. In another specific aspect, the rear axle is coupled to the frame by a rear suspension component. Front and rear suspension components can be the same or a different configuration. Moreover, a front and/or rear suspension component can include a left suspension component and a right suspension component. Thus, a different suspension component can be used to couple the axles to the frame at each coupling location.

It is desirable to position the mobile building 50 as low possible to improve stability of the mobile building during transport. The configuration of the longitudinal and transverse support members can help accomplish this. For example, as illustrated in FIGS. 1 and 2, to accommodate the axles 30, 32, the longitudinal support members 22, 24 can be vertically displaced above the axles and in support of the transverse support members. The transverse support members can be configured to support the mobile building above the front and rear axles such that a vertical distance 8 between the mobile building 50 (such as the frame 52) and the front and rear axles can be minimized, as shown in FIG. 2, to minimize a height 9 of a center of gravity 53 of the mobile building and facilitate unobstructed movement of the front and rear axles through a range of motion of the front and rear suspension components.

The vertical distance of the longitudinal support members above the axles can be any suitable length, such as from about 2 inches to about 10 inches and often about 8 inches. The clearance created by the longitudinal support members can allow the transverse support members to be lowered toward the ground while allowing the axles to move unobstructed through a range of motion of the suspension components. The frame and suspension components are configured to ensure that under maximum operating load conditions, sufficient clearance is maintained between the tires and any features of the mobile building frame 52 or structure to permit unimpeded wheel movement and for changing tires. In one aspect, the longitudinal support members can comprise a straight configuration, such as a straight beam. It should be recognized, however, that the longitudinal support members can have any suitable configuration, and can, in some embodiments, include sections that are locally elevated about the axles to provide the necessary vertical distance or clearance for suspension travel.

The mobile building transportation device 10 can be configured to support the mobile building 50, with the frame 52 of the mobile building resting on the frame 20 of the transportation device. As previously mentioned, the mobile building frame 52 can rest outboard of the longitudinal support members and inboard of the tires 60, 62, 64, 66. For example, the mobile building frame 52 can include an I-beam that is disposed on the right side of the front 26 and rear 28 transverse support members such that the I-beam is between the right longitudinal support member 24 and the front wheel 60 at the front end, and is between the right longitudinal support member 24 and the rear wheel 64 at the rear end of the transportation device 10. Thus, the transportation device frame 20 can be configured such that the mobile building frame 52 rests on one or more transverse support members 26, 28. For example, the mobile building frame can rest on the front 26 and/or rear 28 transverse support members. Of course, an I-beam of the mobile building frame 52 can be similarly disposed on the left side of the transportation device.

With reference to FIG. 3 and continued reference to FIGS. 1 and 2, the mobile building transportation device 10 can further comprise an air brake 80 disposed proximate and operatively connected to one or more axles. The air brake can be configured to act on a wheel coupled to an axle to safely decelerate the frame when the frame supports the mobile building during transport. In one aspect, an air brake can be disposed proximate to at least one of the front axle and the rear axle. Air brakes are superior to the electric brakes often utilized to transport mobile buildings in several aspects including braking power, reliability, and durability.

The mobile building transportation device can be configured for safe use with a mobile building weighing up to 42,000 pounds for a two axle transportation device and 60,000 pounds for a three axle transportation device. Thus, the frame, axles, tires, and braking system are adequate to support, haul, and stop a load and also meet or exceed applicable federal safety regulations.

The mobile building transportation device can also be transported on repeated trips over 300 miles without reconditioning. Thus, a mobile building transportation device of the present disclosure includes components such as tires and wheel bearings that are sufficiently sized and constructed to endure repeated use. In other designs, tires and wheel bearings regularly need to be replaced or refurbished.

Referring to FIG. 4, illustrated is another example of a mobile building transportation device 110, in accordance with the present disclosure. This example shows a mid axle 134 disposed between a front axle 130 and a rear axle 132. The mid axle 134 can be coupled to a frame 120 by a mid suspension component 174. Additionally, left and right longitudinal support members 122, 124 can each be configured to be vertically displaced above the mid axle 134, to allow the mid axle to move unobstructed through a range of motion of the mid suspension component 174. The mid axle 134 can be used, for example, to increase the load carrying capacity of the transportation device. It should be recognized that a mobile building transportation device can include any number of additional axles, as desired. In addition, it should be recognized that the frame can include any suitable number of transverse support members to provide support for the mobile building. In one aspect, a coupling feature 140 can be associated with any of the transverse support members, as desired, for securing the mobile building to the frame.

Figure 5:
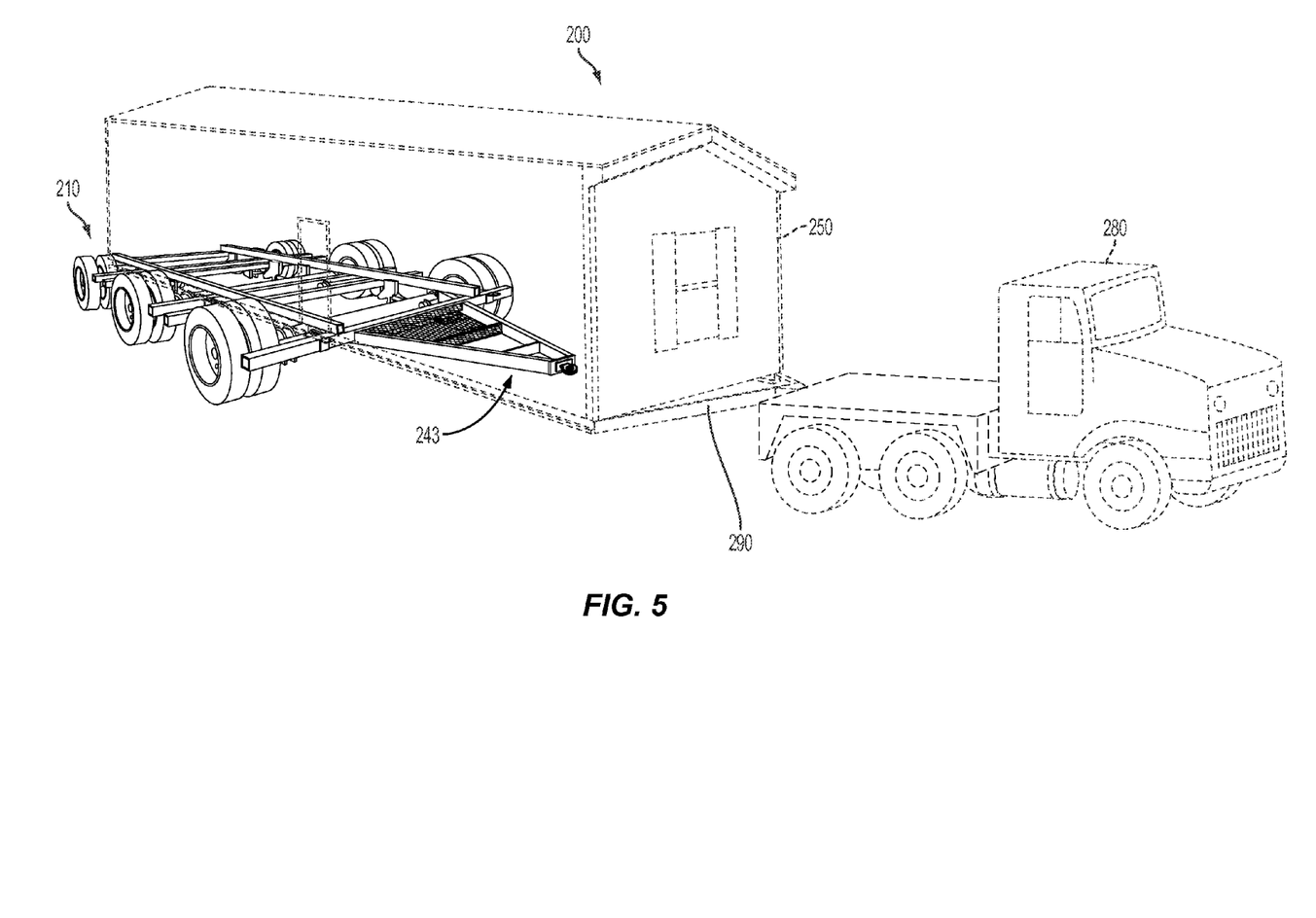
FIG. 5 is a perspective view of a mobile building transportation system in accordance with an example of the present disclosure.

As illustrated in FIG. 5, in accordance with the present disclosure, a mobile building transportation system 200 can comprise a mobile building transportation device 210 as discussed above. The mobile building transportation system can further comprise a mobile building 250 disposed on the mobile building transportation device 210.

As discussed above, the mobile building can weigh 42,000 pounds or up to about 60,000 pounds. Furthermore, the transportation device can transport the mobile building on repeated trips over 300 miles without reconditioning. In a specific aspect, the axles can be 22,500 pound rated per axle, which meets or exceeds applicable federal safety regulations for a 42,000 pound mobile building transported on a transportation device having two axles and a 60,000 pound mobile building transported on a transportation device having three axles.

In one aspect, the transportation system can further comprise a vehicle 280 to tow the mobile building transportation device and the mobile building. In another aspect, the transportation system can include a drawbar 290, such as an A-frame, and a coupling mechanism, such as a hitch, that can connect the mobile building 250 to the towing vehicle 280. The drawbar 290 and hitch can be coupled to a frame of the mobile building. The transportation device 10 can be pulled by the towing vehicle 280, or another suitable vehicle, via the hitch 243 when not transporting a mobile building, such as to return the transportation device after being used to transport a mobile building. In the illustrated system, the vehicle can include a trailer hitch secured to a back end of the vehicle.

In a related example, and to reiterate to some degree, a method of using a mobile building transportation device is presented in accordance with the principles herein. The method comprises obtaining a mobile building transportation device as discussed above. The method also comprises disposing a mobile building on the mobile building transportation device. In one alternative, the mobile building can be built directly on the transportation device. This can alleviate the need for use of expensive cranes or lifting equipment at the manufacturing site and can reduce chances of damage to the mobile building during loading onto the transportation device.

In one aspect, the method further comprises coupling a tow vehicle to the mobile building transportation device. In a specific aspect, the method further comprises towing the mobile building transportation device with the tow vehicle. In another aspect, the axles are 22,500 pound rated per axle. In yet another particular aspect, the mobile building transportation device is configured for safe use with a mobile building weighing up to 60,000 pounds. In still another aspect, the mobile building transportation device can be transported on repeated trips over 300 miles and without reconditioning. In yet another aspect of the method, the mobile building transportation device can further comprise a mid axle disposed between the front axle and the rear axle, coupled to the frame by a mid suspension component. It is noted that no specific order is required in this method, though generally in one embodiment, these method steps can be carried out sequentially.

It is to be understood that the above-referenced embodiments are illustrative of the application for the principles of the present invention. Numerous modifications and alternative arrangements can be devised without departing from the spirit and scope of the present invention while the present invention has been shown in the drawings and described above in connection with the exemplary embodiment(s) of the invention. It will be apparent to those of ordinary skill in the art that numerous modifications can be made without departing from the principles and concepts of the invention as set forth in the claims.

What is claimed is:

1. A mobile building transportation device, comprising:
   a frame to support a mobile building for transport on a public highway, the frame having
   a left longitudinal support member disposed at a left side of the frame and a right longitudinal support member disposed at a right side of the frame,
   a front transverse support member disposed toward a front of the frame and a rear transverse support member disposed toward a rear of the frame, the front and rear transverse support members being configured to interface with the mobile building and bear at least a portion of the weight of the mobile building, and
   a coupling feature associated with each of the front and rear transverse support members for securing the mobile building to the frame;
   a front axle disposed at a front end of the frame, coupled to the frame by a front suspension component; and
   a rear axle disposed at a rear end of the frame, coupled to the frame by a rear suspension component,
   wherein the front and rear transverse support members are configured to support the mobile building above the front and rear axles to facilitate minimizing a vertical distance between the mobile building and the front and rear axles, to minimize a height of a center of gravity of the mobile building and facilitate unobstructed movement of the front and rear axles through a range of motion of the front and rear suspension components, and
   wherein at least one of the left longitudinal support member, the right longitudinal support, the front transverse support member, and the rear transverse support member is constructed, at least in part, of tubing.

2. The mobile building transportation device of claim 1, wherein the front and rear transverse support members are configured to support the mobile building outboard of the left and right longitudinal support members, between the left and right longitudinal support members and a wheel coupled to the front or the rear axle.

3. The mobile building transportation device of claim 1, wherein at least one of the front and rear transverse support members extends from the right side of the frame to the left side of the frame.

4. The mobile building transportation device of claim 1, wherein the coupling feature comprises a flange to facilitate fastening the mobile building to the frame.

5. The mobile building transportation device of claim 4, wherein the flange comprises a hole to receive a fastener.

6. The mobile building transportation device of claim 1, wherein the front and rear transverse support members maintain a width between the left and right longitudinal support members that is substantially the same.

7. The mobile building transportation device of claim 1, further comprising a hitch coupled to the frame to facilitate transporting the mobile building transportation device when not supporting a mobile building.

8. The mobile building transportation device of claim 7, wherein the hitch is coupled to at least one of the front transverse support and the left and right longitudinal supports.

9. The mobile building transportation device of claim 7, further comprising a cargo basket associated with the hitch.

10. The mobile building transportation device of claim 1, wherein the left longitudinal support, the right longitudinal support, the front transverse support member, and the rear transverse support member are constructed, at least in part, of tubing.

11. The mobile building transportation device of claim 1, further comprising an air brake disposed proximate to at least one of the front axle and the rear axle to act on a wheel coupled to the front and/or the rear axle to safely decelerate the frame when the frame supports the mobile building during transport.

12. The mobile building transportation device of claim 1, wherein the front axle and the rear axle are 22,500 pound rated per axle.

13. The mobile building transportation device of claim 1, wherein the mobile building transportation device is configured for safe use with the mobile building weighing up to 60,000 pounds.

14. The mobile building transportation device of claim 1, wherein the mobile building transportation device can be transported on repeated trips over 300 miles and without reconditioning.

15. The mobile building transportation device of claim 1, further comprising a mid axle disposed between the front axle and the rear axle, coupled to the frame by a mid suspension component.

16. The mobile building transportation device of claim 1, wherein the mobile building comprises a manufactured home, a classroom, an office, a storage container, or combinations thereof.

17. A mobile building transportation system, comprising:
a mobile building transportation device as in claim 1; and
the mobile building disposed on the mobile building transportation device.

18. The mobile building transportation system of claim 17, wherein the front and rear transverse support members support the mobile building outboard of the left and right longitudinal support members, between the left and right longitudinal support members and a wheel coupled to the front and/or or the rear axle.

19. The mobile building transportation system of claim 17, wherein the coupling feature comprises a flange and the mobile building is secured to the mobile building transportation device with a fastener that extends through the flange and a portion of the mobile building.

20. The mobile building transportation system of claim 17, further comprising a hitch coupled to the frame to facilitate transporting the mobile building transportation device when not supporting a mobile building.

21. A method of using a mobile building transportation device, comprising:
obtaining the mobile building transportation device as in claim 1; and
disposing the mobile building on the mobile building transportation device.

22. The method of claim 21, further comprising coupling a tow vehicle to the mobile building transportation device.

23. The method of claim 22, further comprising towing the mobile building transportation device with the tow vehicle.

24. The method of claim 21, wherein the mobile building transportation device further comprises a mid axle disposed between the front axle and the rear axle, coupled to the frame by a mid suspension component.

* * * * *